Figure 1:
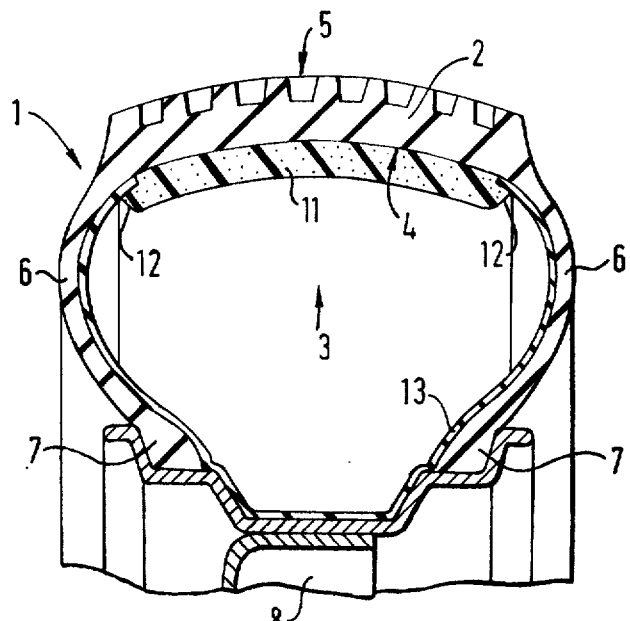

United States Patent
Caccia et al.

[11] 3,921,689
[45] Nov. 25, 1975

[54] SAFETY TIRE WITH A SEALING ACTION AND AN ANTI-BURST ACTION

[75] Inventors: Angelo Caccia; Vincenzo Benatti, both of Milan, Italy

[73] Assignee: Industrie Pirelli S.p.A., Milan, Italy

[22] Filed: July 25, 1973

[21] Appl. No.: 382,363

[30] Foreign Application Priority Data
Aug. 1, 1972 United Kingdom............. 35976/72

[52] U.S. Cl. .................. 152/347; 152/312; 106/33
[51] Int. Cl.² ......................................... B60C 17/00
[58] Field of Search ................. 152/203, 346–348, 152/310–314; 106/33; 156/99–115

[56] References Cited
UNITED STATES PATENTS

| | | | |
|---|---|---|---|
| 1,889,799 | 12/1932 | Clark | 152/348 |
| 2,325,354 | 7/1943 | Wyman | 152/348 |
| 2,563,787 | 8/1951 | Keefe | 152/346 |
| 2,752,979 | 7/1956 | Knill et al. | 152/347 |
| 2,765,018 | 10/1956 | Connell | 152/347 |
| 2,802,505 | 8/1957 | Peterson et al. | 152/347 |
| 3,022,810 | 2/1962 | Lambe | 152/310 |
| 3,042,098 | 7/1962 | Reinowski et al. | 152/347 |
| 3,090,416 | 5/1963 | Schrank | 152/347 |
| 3,100,518 | 8/1963 | Dresser | 152/347 |
| 3,605,848 | 9/1971 | Lombardi et al. | 152/310 |
| 3,628,585 | 12/1971 | Pace | 152/347 |

Primary Examiner—Drayton E. Hoffman
Attorney, Agent, or Firm—Stevens, Davis, Miller & Mosher

[57] ABSTRACT

A pneumatic tire with both a sealing action and an anti-burst action is disclosed. The tire has an inflatable structure made of an elastic foam material having prevailingly closed cells in the form of an annular band below the tread band of the casing with a width at least equal to the width of the tread band and means preventing the flow of tire air out of the area between the outer surface of the annular band and the casing inner surface corresponding thereto. The tire can be radial if desired.

18 Claims, 6 Drawing Figures

SAFETY TIRE WITH A SEALING ACTION AND AN ANTI-BURST ACTION

The present invention relates to a safety tire capable of providing both an efficient sealing action if the tread band of the relative casing is punctured by a foreign body, and a reliable anti-burst action if a tear takes place in one of the sidewalls of said casing. Moreover, the behavior of the tire of the present invention does not substantially differ from that of a conventional tire during its service.

Known safety tires comprise a casing partially or totally filled with foam material, which is normally vulcanized rubber foam. If a puncture originates in the tread band of a tire of this conventional type, the foam material, which fills the inside of the hole, reduces the escape of air from the tire, allowing it to carry out a certain travel in emergency conditions.

These known safety tires however have many disadvantages.

The first drawback is of a thermal nature. In ordinary tires, heat is generated in the casing particularly in the tread caused by the friction against the featheredge and due to the cyclic deformations of these materials which form the casing itself. This heat is in part irradiated or transmitted to the surrounding air, and is in part transmitted to the air, found inside the tire, which in its turn transmits it to the rim; due to the metallic nature of the rim, the heat is dispersed into the surrounding air. In general, the amount of heat transmitted internally is 10-15 percent of the total and its transmission is caused by the convection motions of the inflation air, as it is subjected to a field of centrifugal forces caused by the tire rotation. These motions are very strong, since the centrifugal field normally reaches values of some hundreds of gravity units in a rotating tire. It is therefore clear that the presence of a large foam volume, which greatly reduces said convection motions, limits the transmission of heat internally, consequently increasing the average temperature of the casing.

This temperature increase, in a known safety tire is also produced by the amount of heat generated by the cyclic deformation (hysteresis) of the considerable mass of the foam material.

Moreover, in a pneumatic tire of the above described type, unbalancing forces of remarkable size are easily originated which can impair the tire performance. In fact, owing to the large foam material mass, disuniformities in said mass (due to irregular formation of the material or displacements of same occuring during service conditions) can occur, which cause unbalancing centrifugal forces.

Further, the moment of inertia of a tire of the described type is considerably higher than that of a conventional tire devoid of the foam material. It follows that the dynamic behavior (reaction to steering and acceleration) of said tire will in general be worse than that of a conventional tire.

Furthermore, the distribution of the stresses in the casing of a tire as described above is different from that of a conventional tire as the stresses in the former, in general, are higher and said distribution is considerably influenced by the speed of rotation of the tire itself. It follows that some advantageous characteristics of said tire (as road holding), which are dependent on its elastic behavior, are worsened and will vary with variations in the speed of rotation.

Tubeless safety tires are also known, having an inner surface completely covered by a layer of foam material. These tires have the disadvantage that the layer of foam material, which is perfectly adherent to said surface, is easily punctured as is the tread band, by a foreign body penetrating into it. Moreover, although said tires are able to ensure a sealing action, they cannot carry out an anti-burst action.

The present invention aims to provide a safety tire devoid of the above mentioned disadvantages.

The tire of the present invention, comprising a casing, is characterized in that inside said casing provision is made of an inflatable structure comprising an annular band of elastic foam material having prevailingly closed cells, situated below the tread band of the casing and having a width at least equal to that of said tread band, and means capable of preventing the flowing of the tire inflation air in the space comprised between the outer surface of said annular band and the corresponding inner surface of the casing below which said band is situated.

Figure 2:
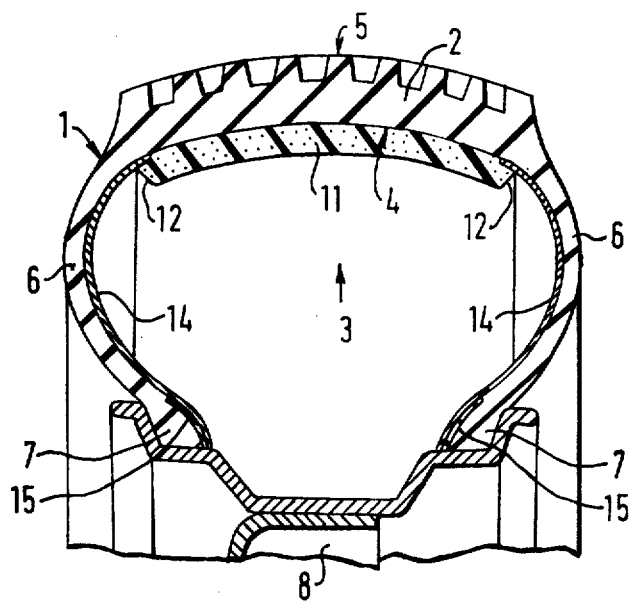
Figure 3:
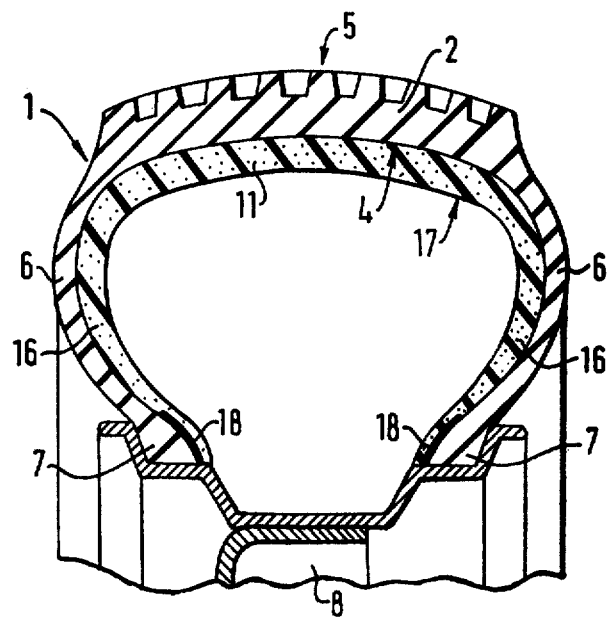
Figure 4:
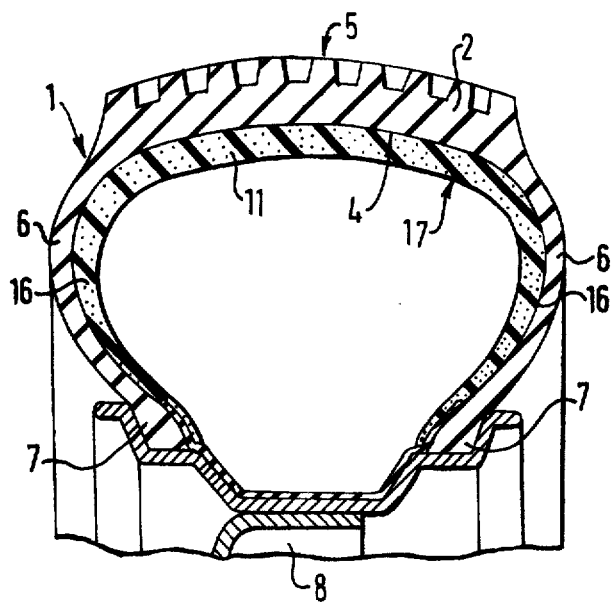
Figure 5:
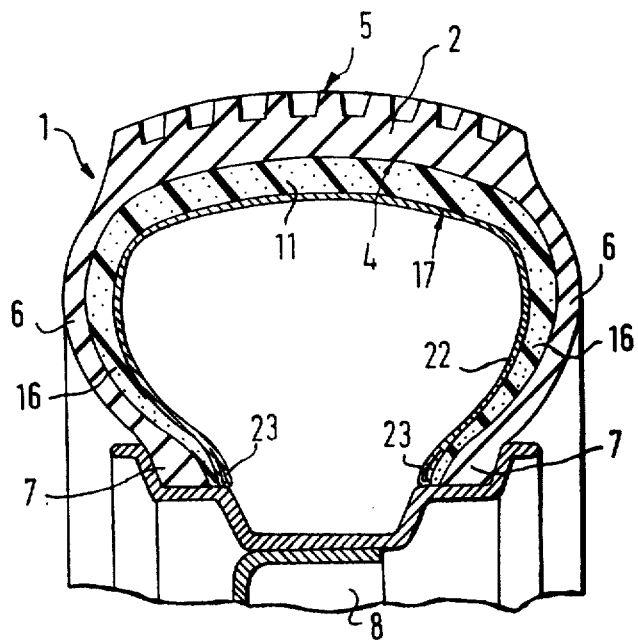
Figure 6:
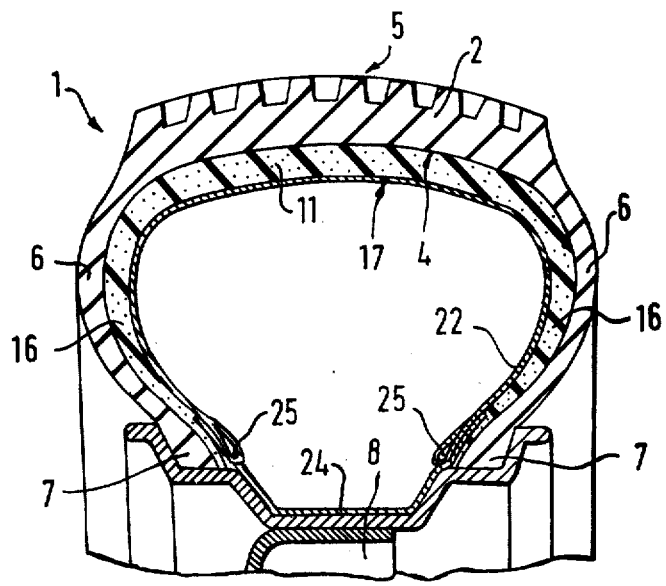

For a better understanding of the invention, description will now be made, by way of example, of some particular embodiments, with reference to the attached drawings, in which:

FIGS. 1 and 2 represent sections, taken along a diametrical plane, of tires corresponding to a first embodiment of the invention, and of part of the rim on which they are fitted;

FIGS. 3 and 4 represent sections, analogous to those of FIGS. 1 and 2, of tires corresponding to a second embodiment of the invention; and FIGS. 5 and 6 represent sections, analogous to those of the preceding figures, of tires corresponding to a third embodiment of the invention.

Referring initially to the embodiment shown in FIGS. 1 and 2, the tire according to the invention, indicated generally as 1, comprises substantially a casing 2 inside which is arranged an inflatable structure 3, which is in contact with the inner surface 4 of the casing itself.

The casing 2 can conveniently be a conventional casing for tubeless tires, comprising a tread band 5, sidewalls 6 and beads 7 by means of which the casing is tightly fitted on a rim 8.

A sealing layer (liner), substantially constituted by a soft rubber compound can be conveniently arranged on the inner surface of the casing 2.

The structure 3 comprises substantially an annular band 11, constituted by elastic foam material having prevailingly closed cells, whose width, in the axial direction, is substantially equal to that of the tread band 5.

In the embodiment of FIG. 1, the lateral edges 12 of said band are secured to the corresponding edges of a deformable element 13 intended to lean both on the sidewalls 6 of the casing 2 and on the rim 8, so as to form together with the remaining part of said structure, a tight annular envelope for the air used to inflate the tire.

The material forming the band 11 can be any elastic material which can be formed in such a way as to create a foam having prevailingly closed cells. Even if it can be assumed that intercommunicating cells exist in said material, however, it must be thought that, in the whole, the number of closed cells is preponderant and that, by adopting for the band 11 the thickness which will be described infra, a band is obtained which cannot be penetrated substantially by the inflation air. Conveniently, said material is a vulcanized rubber foam or a plastic material foam, which is obtained according to conventional techniques for making elastic material foams. Moreover, for reasons to be explained later, the forming operation must be carried out in such a way that a pre-established pressure, whose value is substantially equal to that of the tire inflation pressure, is present inside each of the closed cells of the material at the end of its operation. If this requirement is met, the variation in the shape of said annular band, in its passage from the condition in which it is at the end of the forming operation to its working condition (in the presence of the inflation pressure) is obviously substantially negligible.

The thickness of the band 11, measured in the radial direction and with the tire in inflated condition, is no greater than 20 mm. Moreover, the density of the material forming said band is such that the moment of polar inertia of the band, measured with respect to its axis of rotation, is equal to or smaller than one fifth of the moment of polar inertia of the tire without the band. If this condition exists, the variation of the moment of inertia, which occurs when a wheel equipped with the tire according to the present invention is used instead of a wheel equipped with a conventional tire, can be acceptable.

The deformable element 13 can be replaced, as in the tire shown in FIG. 2, by a pair of deformable annular sidewalls 14, each of which is intended to lean substantially on the inner surface of a corresponding sidewall 6 of the casing 2. The outer circular edge of each of said sidewalls is secured to a corresponding edge 12 of the annular band 11, while the inner circular edge of each of them is tightly connected to the inner surface of a corresponding bead 7 of the casing 2. This connection can be carried out, for instance, by a coating of an adhesive agent 15.

The tire according to the embodiment illustrated in FIGS. 3 and 4 differs from that of the preceding figures in that the annular band 11 is provided with sidewalls 16 constituted by the same elastic foam material which constitutes the band, and forms a single piece therewith, so as to originate an element comprising a band and sidewalls, indicated in its whole as 17. Conveniently, the thickness of each sidewall 16 of said element decreases towards the corresponding bead 7 of the casing 2. The inner circular edges of each of said sidewalls are tightly connected on the inner surface of the corresponding bead 7 of the tire, for instance by a coating of adhesive agent 18, as shown in FIG. 3. According to an alternative arrangement, the inner circular edges of said sidewalls are connected to a corresponding edge of an annular deformable element 21 (FIG. 4) intended to lean on the rim 8 and to form a tight annular envelope for the inflation air with element 17.

The tire according to the embodiment illustrated in FIGS. 5 and 6 comprises an element 17, which is quite similar to that of the tire according to the embodiments of FIGS. 3 and 4, comprising an annular band 11 and sidewalls 16, made of elastic foam material.

Inside said element, provision is made for a small carcass 22, intended to lean, when the tire is in inflated condition, on the inner surface of the element 17 and to take substantially the same profile as said surface. The small carcass can also be bonded to the inner surface of the element 17.

The small carcass 22 comprises substantially one or more plies of textile or metallic cords, and is provided with cores 23 as represented in FIG. 5, capable of generating pressures on the inner circular edges of the sidewalls 16 of the element 17, in order to ensure adequate tightness between said edges and the corresponding beads 7 of the casing 2. According to a different arrangement, the small carcass 22 can be an integral part of the band 11; in such a case the cords of the small carcass can be directly embedded in the foam material forming the band and can be situated in proximity of the inner surface of the latter.

In an alternative embodiment illustrated in FIG. 6, each inner circular edge of the small carcass 22 is secured to a corresponding edge of an annular deformable element 24, intended to lean on the rim 8 and to form, together with the small carcass, a tight annular envelope for the inflation air.

The arrangement of the cords of the plies of the small carcass 22 can be chosen at will. Conveniently, for reasons described herein, the inclination of the cords of one or more plies of the small carcass 22 is not coincident with the inclination of the cords of the plies of the carcass (not represented) of the casing 2. For instance, if the carcass of the casing 2 comprises several superimposed cord plies, situated in such a way that the cords of each ply have a different inclination with respect to the cords of another ply, the cords of the small carcass 22 will have a substantially radial position, i.e., they will form an angle ranging between 88° and 90° with respect to the parallels of the small carcass itself. On the contrary, if the casing 2 is of the radial type, the cords of the small carcass 22 have a substantially sub-radial position, namely forming an angle ranging between 75° and 80° with respect to the parallels of the small carcass itself.

The working of the described tire, in operation and in emergency conditions (puncture and burst) occurs as follows:

In the absence of the inflation pressure, the annular band 11 (FIG. 1) and the element 17 (FIG. 3) have, inside the casing 2, a shape different from that they have in service under the action of the inflation pressure. In fact, as mentioned supra, since the pressure inside the cells of the material forming the band 11 or the element 17 is substantially equal to the inflation pressure, when this pressure is absent the parts deform and take a volume greater than the volume they have both during the forming operation and in the condition of inflation of the tire. Therefore, when the inflation pressure acts inside the tire, the shape assumed by the material forming the band 11 or the element 17 is substantially identical to the shape of formation of the material itself. It follows that, during working, no deformations and therefore no stresses will occur in the material forming said band or element, so that it is possible to avoid the occurrence of creep phenomena. In operation, inside the foam material forming the band 11 or the element 17, there are moreover cells in direct pneumatic communication with one another and with non-communicating cells, which all have the value of the inflation pressure in common.

Let us now assume that a foreign body enters the tread band 5, penetrating inside it. Three conditions can substantially take place, which will be considered separately.

In a first condition, the depth of penetration of said body is substantially equal to the thickness of the tread band 5, resulting in the formation of a hole, but damages or deformations of the band 11 have not yet taken place. In this condition, even if there is a communication between the atmosphere and the space comprised between the outer surface of the structure 3 (FIG. 1) (or the element 17) (FIG. 3)) and the inner surface of the casing 2, air cannot escape from the tire; in fact, the air contained inside it cannot flow into said space as a direct result of the tightness obtained by means of the deformable element 13 (FIG. 1), 21 (FIG. 4) or 24 (FIG. 6), or by the bonding 15 (FIG. 2), or 18 (FIG. 4) or by means of the pressure applied by the cores 23 (FIG. 5) of the small carcass 22 to the beads 7 of the tire.

In a second condition, the depth of penetration of the foreign body is slightly greater than the thickness of the tread band 5. In said case, the body deforms the band 11 without damaging it, as the latter is not secured to the inner surface of the casing 2 and is relatively deformable.

In a third condition, the depth of penetration of the foreign body is greater than in the preceding case; therefore said body, besides detaching the band 11 from the inner surface of the casing, perforates said band in a partial or total fashion. If the surface of the damaged foam material, in correspondence of the foreign body, is perfectly impermeable (namely if a zone of closed cells exists at that point), under the thrust of the inner pressure the surface of said material adheres intimately to the surface of the body itself, preventing any air escape. On the contrary, if a certain percentage of open cells, communicating with one another, exists in the material, in immediate proximity of the body, said cells form a more or less branched net of cavities, through which a distribution of pressures and outflow speeds is created, which is regulated by the two extreme values of the pressure (atmospheric pressure and inflation pressure) and by the friction generated by the air motion in said cavities; at the same time, however, the more or less pronounced reduction of pressure in the open cells with respect to its initial value causes the closed cells, adjacent to the open cells, to increase their volume. It follows that there is a reduction in the volume of the open cells, namely a reduction of the average section of the cavities with a consequent increase of friction and decrease of the outflow. It can be understood that, the greater the percentage of closed cells and the lower the elastic reaction of the material to the increase in volume of the closed cells, the more reduced the air loss which has taken place in consequence of the puncture of the band 11, at the end of the above described transitory period.

After being punctured, the band 11 which, as stated above, has detached from the inner surface of the casing 2, leans again on said surface under the thrust of the inflation pressure.

When the material forming said band again comes into contact with said surface, it does not re-assume the shape it had before being punctured, but rather accumulates to a larger extent in the proximity of the foreign body; in fact, the considerable friction between the surface of the band 11 and the inner surface of the casing 2 prevents the former from again taking completely the shape it had during puncturing. This accumulation of material forming the band 11 further improves the ability of the material itself to prevent air escape through the hole produced in the band.

Moreover, the foreign body is retained within the foam, since the elastic material, under the thrust of the inner pressure, strongly adheres to the surface of said body. On its turn, the permanence of the foreign body within the hole it has originated in the band 11 reduces the air escape.

If the small carcass 22 is associated with the tire structure of the embodiment shown in FIGS. 3 and 4, to form the embodiment shown in FIGS. 5 and 6, the tire according to the invention in addition to providing sealing action is also able to carry out an efficient anti-burst action, which takes place as follows.

Before explaining how said anti-burst action is carried out, an examination will be made of the behavior of the small carcass 22 in operation.

The profile of said small carcass is preferably so determined that, in conditions of normal operation (in the presence of the inflation pressure) the cords of the small carcass are subjected to very low or even no tensions, namely said small carcass remains in a balanced condition under the action of the two substantially equal and opposite pressures, that is the inflation pressure and the reaction pressure, due to the compressed air in the foam material forming the element 17. In other words, the small carcass 22 is normally made in such a way that, when it is introduced in the tire and is subjected to the inflation pressure, it assumes an inner meridian profile capable of deforming the element 17 to an extent sufficient to originate a pressure substantially equal to the inflation pressure in the cells of the foam material.

A first reason, justifying the advisability of this expedient is due to the distribution of the stresses existing in the casing 2, which must be modified in a negligible extent by the introduction of the structure constituted by the small carcass 22 and the element 17; it follows that, for the tire of the invention, one can use casings 2 already experimented and set up, without creating new casings. Another reason is that of limiting the deformation of the foam material and therefore of increasing the fatigue resistance of said material. In fact, the elastic foam materials at present foreseen do not possess a high fatigue resistance. If the whole inflation pressure does not act on the casing 2, this increases the mobility of the tread band 5 with respect to the small carcass 22 both in the radial direction and in the impression area because the former becomes more deformable and the latter more rigid as it is subjected to a greater tension; this greater mobility results in greater deformations of alternative type imparted to the foam material, the endurance of which can be compromised.

The scope of the invention comprises anyhow a tire in which the small carcass 22 is so devised as to withstand a more or less large part of the inflation pressure, thus releasing the pressure withstood by the casing 2.

Let us now assume that a tear is originated in casing 2 which normally happens in one of the sidewalls 6. Owing to the presence of the sidewalls 16 of the element 17, which act as a true upholstery for the small carcass 22, when a tear occurs in one of the sidewalls 6 of the casing, said tear does not extend to the small carcass, which is therefore saved from damage occurred in casing 2. Subsequently, the portion of the small carcass which is situated in proximity of the tear is pushed, by the action of the inflation air, towards said tear, in respect of which it behaves as a true patch, preventing the escape of the air contained therein, and therefore allowing the vehicle to carry out an emergency travel of a certain length, sufficient to reach a repair station.

If the casing 2 is of the conventional type (in which the carcass comprises several crossed plies) or of the radial type (in which the cords of the relative carcass form an angle of substantially 90° with respect to the parallels of said carcass), it is preferable to use a small carcass 22, in which the cords have a radial arrangement (that is the angle they form with the parallels of the small carcass ranges between 88° and 90°) or a sub-radial arrangement (that is the angle they form with the parallels of the small carcass ranges between 75° and 80°). In this way, an arrangement is obtained, in which the direction followed by the tear of one of the sidewalls 6 of the casing 2 is substantially orthogonal (and forms an angle other than 0°) to the direction of greater resistance to flexion of the small carcass itself. It follows that said small carcass is never pinched between the edges of said tear.

As it appears from the above, the pneumatic tire of the invention has a behavior in use quite analogous to that of a conventional tire comprising only the casing 2. In fact, mainly due to the small thickness of the band 11 or of the element 17, and of the small moment of inertia of said parts, the heating of the tire according to the invention and its elastic and dynamic parameters (radial and transversal deformability, road holding etc.) are substantially equal those of a corresponding tire of the conventional type.

Moreover, said tire is able to carry out a valid sealing action (embodiment of FIGS. 1 to 4), to which can be associated a valid anti-burst action (embodiment of FIGS. 5 and 6).

It is understood that modifications can be made to the embodiments described in the present invention, without falling outside its scope. In particular, a conventional inner tube can be situated inside or outside the structure 3 (FIG. 1) or inside the small carcass 22 (FIG. 5) or outside the element 17.

What is claimed is:

1. A pneumatic tire having a casing with a tread band, comprising:
    an annular band of elastic foam material with prevailingly closed cells, capable of leaning on the internal surface of said casing situated below said tread band, the width of the annular band being at least equal to the width of the tread band of said tire, the thickness of the annular band being no greater than 20 mm and the moment of polar inertia of the annular band measured with respect to the axis of rotation being no greater than one fifth of the moment of inertia of the tire devoid of said band;
    a pair of deformable sidewalls for said annular band, each of which is intended to lean substantially on a corresponding sidewall of said casing and has an outer circular edge secured to a corresponding lateral edge of said annular band, and extending upon the side wall of the casing up to a corresponding bead of the tire, so that said annular band and said pair of deformable sidewalls define an inflatable structure;
    means capable of preventing the flow of tire inflation air from said inflatable structure in the space between the outer surface of the latter and the corresponding inner surface of the casing below which said structure is situated.

2. The pneumatic tire of claim 1 wherein said material forming said annular band is a vulcanized rubber foam.

3. The pneumatic tire of claim 1 wherein said material forming said annular band is a plastic material foam.

4. The pneumatic tire of claim 1 wherein said annular band is built up by a forming operation to produce a pre-established pressure inside the cells of the material of which it is constituted such that the pressure at the end of the forming operation will be substantially equal to the inflation pressure of the tire.

5. The pneumatic tire of claim 1 wherein said means capable of preventing the flow of tire inflation air comprises an annular deformable element intended to lean substantially on the sidewalls of said tire and on the rim and provided with two circular edges, each of which is connected to a corresponding lateral edge of said annular band to form a tight annular envelope with said band.

6. The pneumatic tire of claim 1 wherein stiffening cords are disposed in one or more layers inside said annular band and in the proximity of its inner surface.

7. The pneumatic tire of claim 1 wherein said means capable of preventing the flow of tire inflation air comprises an inner circular edge on each of said deformable sidewalls tightly connected with a corresponding bead of said tire.

8. The pneumatic tire of claim 7 wherein said inner circular edge of each of said deformable sidewalls is connected by bonding to the relative bead of said tire.

9. The pneumatic tire of claim 7 wherein said deformable sidewalls for said annular band are made of elastic foam material to form an individual element with said band comprising a central band and sidewalls.

10. The pneumatic tire of claim 9 wherein the inner circular edge of each sidewall of said element comprising a central band and sidewalls is secured to a corresponding edge of an annular deformable element intended to lean on the rim and to form a tight annular envelope with said element comprising a central band and sidewalls.

11. The pneumatic tire of claim 9 wherein said inflatable structure comprises a small carcass provided with one or more cord plies, arranged inside said element comprising a central band and sidewalls, and intended to be in contact both with the central band and the sidewalls of the element itself.

12. The pneumatic tire of claim 11 wherein said small carcass leans both on the central band and on the sidewalls of said element.

13. The pneumatic tire of claim 11 wherein said small carcass is bonded to the inner surface of said element comprising a central band and sidewalls.

14. The pneumatic tire of claim 11 wherein said small carcass is provided with bead capable of exerting pressures on the inner edge of each sidewall of said element comprising a central band and sidewalls to ensure a seal between said edge and the corresponding bead of said tire.

15. The pneumatic tire of claim 14 wherein each inner circular edge of said small carcass is secured to a corresponding edge of an annular deformable element intended to lean on the rim and to form a tight annular envelope with said small carcass.

16. The pneumatic tire of claim 11 wherein said casing comprises one or more cord plies, characterized in that the cords of the plies of said small carcass form an angle considerably different from 0° with the cords of the plies of said casing such that the direction of maximum resistance to flexion of said cord plies of said small carcass forms an angle considerably different from 0° with the direction in which a tear in said casing is more likely to occur in case of a tire burst.

17. The pneumatic tire of claim 16 wherein said casing comprises several superimposed plies of cord fabric arranged in such a way that the cords of each ply have a different inclination with respect to the cords of another ply, characterized in that the cords of said plies of the small carcass have a substantially radial arrangement forming an angle ranging from 88° to 90° with respect to the parallels of the small carcass.

18. The pneumatic tire of claim 16 wherein the casing is of the radial type, characterized in that the cords of said plies of said small carcass have a substantially sub-radial arrangement forming an angle ranging from 75° to 80° with respect to the parallels of the small carcass.

* * * * *